United States Patent
Yang et al.

(10) Patent No.: US 12,537,949 B2
(45) Date of Patent: Jan. 27, 2026

(54) METHODS AND APPARATUS FOR KERNEL TENSOR AND TREE PARTITION BASED NEURAL NETWORK COMPRESSION FRAMEWORK

(71) Applicant: InterDigital VC Holdings, Inc., Wilmington, DE (US)

(72) Inventors: Hua Yang, Plainsboro, NJ (US); Duanshun Li, Plainsboro, NJ (US); Dong Tian, Boxborough, MA (US); Yuwen He, San Diego, CA (US)

(73) Assignee: InterDigital VC Holdings, Inc., Wilmington, DE (US)

( * ) Notice: Subject to any disclaimer, the term of this patent is extended or adjusted under 35 U.S.C. 154(b) by 502 days.

(21) Appl. No.: 17/621,476

(22) PCT Filed: Jul. 2, 2020

(86) PCT No.: PCT/US2020/040587
§ 371 (c)(1),
(2) Date: Dec. 21, 2021

(87) PCT Pub. No.: WO2021/003325
PCT Pub. Date: Jan. 7, 2021

(65) Prior Publication Data
US 2022/0360778 A1    Nov. 10, 2022

Related U.S. Application Data

(60) Provisional application No. 62/869,679, filed on Jul. 2, 2019.

(51) Int. Cl.
*H04N 19/119*    (2014.01)
*H04N 19/105*    (2014.01)
(Continued)

(52) U.S. Cl.
CPC .......... *H04N 19/119* (2014.11); *H04N 19/105* (2014.11); *H04N 19/172* (2014.11); *H04N 19/96* (2014.11)

(58) Field of Classification Search
None
See application file for complete search history.

(56) References Cited

U.S. PATENT DOCUMENTS

| 2013/0107950 A1 | 5/2013 | Guo et al. |
| 2016/0044314 A1 | 2/2016 | Rinaldi |

(Continued)

FOREIGN PATENT DOCUMENTS

| CN | 106663085 A | 5/2017 |
| WO | 2019/086104 A1 | 5/2019 |

OTHER PUBLICATIONS

Wang et al., "Huawei's response to the Call for Proposal on Neural Network Compression", 126. MPEG Meeting; Mar. 25, 2019-Mar. 29, 2019; Geneva, No. m47491, Mar. 29, 2019. (Year: 2019).*

(Continued)

*Primary Examiner* — James M Anderson, II
(74) *Attorney, Agent, or Firm* — Condo Roccia Koptiw LLP

(57) ABSTRACT

A method of encoding or decoding a video comprising a current picture, a first reference picture, and a weight tensor associated with a trained neural network (NN) model are provided. The method includes generating any number of kernel tensors, input channels and output channels associated with the weight tensor, each kernel tensor being associated with any of: a layer type, an input signal type, and a tree partition type, and each kernel tensor including weight coefficients, generating, for each of the any number of kernel tensors, tree partitions for any of a coding tree unit (CTU), a coding unit (CU), a prediction unit (PU), and a transform unit (TU) according to respective tree partition types asso- (Continued)

ciated with each of the any number of kernel tensors, and generating a compressed representation of the trained NN model by compressing and coding the any number of kernel tensors.

20 Claims, 9 Drawing Sheets

(51) Int. Cl.
 *H04N 19/172* (2014.01)
 *H04N 19/96* (2014.01)

(56) References Cited

U.S. PATENT DOCUMENTS

| | | | |
|---|---|---|---|
| 2019/0035113 | A1 | 1/2019 | Salvi et al. |
| 2019/0075301 | A1 | 3/2019 | Chou et al. |
| 2021/0125070 | A1* | 4/2021 | Wang .................. G06N 3/082 |

OTHER PUBLICATIONS

"Description of Core Experiments on Compression of Neural Networks for Multimedia Content Description and Analysis", ISO/IEC JTC1/SC29/WG11/N18461, MPEG Meeting 126, Geneva, XP0302308730, Mar. 25-29, 2019, 17 pages (Year: 2019).*

Agustsson et al., "Soft-to-Hard Vector Quantization for End-to-End Learning Compressible Representations", In Advances in Neural Information Processing Systems, arXiv:1704.00648v2, Jun. 8, 2017, pp. 1-16.

Aytekin et al., "Compressibility Loss for Neural Network Weights", arXiv:1905.01044v1, May 3, 2019, 7 pages.

Bross et al., "High Efficiency Video Coding (HEVC) Text Specification Draft 10 (for FDIS & Consent)", JCTVC-L1003_V1, Editor, Joint Collaborative Team on Video Coding (JCT-VC) of ITU-T SG 16 WP 3 and ISO/IEC JTC 1/SC 29/WG 11, 12th Meeting: Geneva, CH, Jan. 14-23, 2013, 321 pages.

Chen et al., "Algorithm Description for Versatile Video Coding and Test Model 5 (VTM 5)", JVET-N1002-v1, Editors, Joint Video Experts Team (JVET) of ITU-T SG 16 WP 3 and ISO/IEC JTC 1/SC 29/WG 11, 14th Meeting: Geneva, CH, Mar. 19-27, 2019, 70 pages.

Choi et al., "Towards the Limit of Network Quantization", ICLR 2017, arXiv:1612.01543v2, Nov. 13, 2017, pp. 1-14.

Choi et al., "Universal Deep Neural Network Compression", arXiv:1802.02271v2, Feb. 21, 2019, 5 pages.

Denil et al., "Predicting Parameters in Deep Learning", In Advances in Neural Information Processing Systems, Oct. 27, 2013, pp. 1-9.

Denton et al., "Exploiting Linear Structure Within Convolutional Networks for Efficient Evaluation", In Advances in Neural Information Processing Systems, 2014, pp. 1-9.

Duanshun et al., "NNR CE2-related: On Quantization for Neural Network Compression", ISO/IEC JTC1/SC29/WG11, No. m49408, 127 MPEG Meeting, Jul. 8-12, 2019.

Gong et al., "Compressing Deep Convolutional Networks Using Vector Quantization", ICLR 2015, arXiv:1412.6115v1, Dec. 18, 2014, pp. 1-10.

Han et al., "Deep Compression: Compressing Deep Neural Networks with Pruning, Trained Quantization and Huffman Coding", ICLR 2016, arXiv:1510.00149v5, Feb. 15, 2016, pp. 1-14.

ISO/IEC, "Updated Call for Proposals on Neural Network Compression", MPEG Requirements, ISO/IEC JTC1/SC29/WG11/N18162, Marrakech, MA, Jan. 2019, 8 pages.

ISO/IEC, "Updated Evaluation Framework for Compressed Representation of Neural Networks", Requirements Subgroup, ISO/IEC JTC1/SC29/WG11/N18129, Marrakech, MA, Jan. 2019, 12 pages.

Jain et al., "Response to the Call for Proposals on Neural Network Compression, Low Displacement Rank based compression of Deep Neural Networks", Technicolor, ISO/IEC JTC1/SC29/WG11 MPEG2019/M47493, Geneva, Switzerland, Mar. 2019, 6 pages.

Jin et al., "Flattened Convolutional Neural Networks for Feedforward Acceleration", ICLR 2015, arXiv:1412.5474v4, Nov. 20, 2015, pp. 1-11.

Kim et al., "Compression of Deep Convolutional Neural Networks for Fast and Low Power Mobile Applications", arXiv:1511.06530v2, Feb. 24, 2016, pp. 1-16.

Laude et al., "Neural Network Compression Using Transform Coding and Clustering", arXiv:1805.07258v1, May 18, 2018, 4 pages.

Li et al., "A Deep Convolutional Neural Network Approach for Complexity Reduction on Intra-Mode HEVC", Proceedings of the IEEE International Conference on Multimedia and Expo (ICME) 2017, Jul. 10-14, 2017, pp. 1255-1260.

Polino et al., "Model Compression via Distillation and Quantization", ICLR 2018, arXiv:1802.05668v1, Feb. 15, 2018, pp. 1-21.

Sullivan et al., "Overview of the High Efficiency Video Coding (HEVC) Standard", IEEE Transactions on Circuits and Systems for Video Technology, vol. 22, No. 12, Dec. 2012, pp. 1649-1668.

Wiedemann et al., "Entropy-Constrained Training of Deep Neural Networks", arXiv:1812.07520v2, Dec. 19, 2018, 8 pages.

Bross et al., "Versatile Video Coding (Draft 5)", JVET-N1001-V10, Joint Video Experts Team (JVET) of ITU-T SG 16 WP 3 and ISO/IEC JTC 1/SC 29/WG 11, 14th Meeting, Geneva, Switzerland, Mar. 19, 2019, 406 pages.

Bossen, Frank, "VTM Software Manual", Joint Video Experts Team (JVET) of ITU-T SG16 WP3 and ISO/IEC JTC1/SC29/WG11, 34 pages.

ISO/IEC, , "Description of Core Experiments on Compression of Neural Networks for Multimedia Content Description and Analysis", ISO/IEC JTC1/SC29/WG11/N18461, MPEG Meeting 126, Geneva, XP0302308730, Mar. 25-29, 2019, 17 pages.

ISO/IEC, "Evaluation Results of the Call for Proposals on Neural Network Compression", ISO/IEC JTC1/SC29/WG11, No. n18352, 126 MPEG Meeting, XP030208622, Mar. 25-Mar. 29, 2019, 15 pages.

* cited by examiner

US 12,537,949 B2

METHODS AND APPARATUS FOR KERNEL TENSOR AND TREE PARTITION BASED NEURAL NETWORK COMPRESSION FRAMEWORK

CROSS REFERENCE TO RELATED APPLICATIONS

This application is the National Stage entry under 35 U.S.C. § 371 of Patent Cooperation Treaty Application PCT/US20/040587, filed 2 Jul. 2020 and claims the benefit of U.S. Provisional Application No. 62/869,679, filed 2 Jul. 2019, the contents of each of which are incorporated by reference herein.

BACKGROUND

Video coding systems are widely used to compress digital video signals to reduce the storage need and/or transmission bandwidth of such signals. Among the various types of video coding systems, such as block-based, wavelet-based, and object-based systems, nowadays block-based hybrid video coding systems are the most widely used and deployed. Examples of block-based video coding systems include international video coding standards such as the MPEG1/2/4 part 2, H.264/MPEG-4 part 10 AVC, VC-1, and the latest video coding standard called High Efficiency Video Coding (HEVC), which was developed by JCT-VC (Joint Collaborative Team on Video Coding) of ITU-T/SG16/Q.6/VCEG and ISO/IEC/MPEG.

The first version of the HEVC standard was finalized in January 2013, and offers approximately 50% bit-rate saving at equivalent perceptual quality compared to the prior generation video coding standard H.264/MPEG AVC. Although the HEVC standard provides significant coding improvements over its predecessor, there is evidence that higher coding efficiency can be achieved with additional coding tools over HEVC. Based on that, both VCEG and MPEG started the exploration work of new coding technologies for future video coding standardization. In October 2015, ITU-T VCEG and ISO/IEC MPEG formed the Joint Video Exploration Team (JVET) to begin significant study of advanced technologies that could enable substantial enhancement of coding efficiency over HEVC. In the same month, a software codebase, called Joint Exploration Model (JEM) was established for future video coding exploration work. The JEM reference software was based on HEVC Test Model (HM) that was developed by JCT-VC for HEVC. Additional proposed coding tools may be integrated into the JEM software and tested using JVET common test conditions (CTCs).

Neural networks (NN) may be used in Artificial Intelligence (AI) related applications, for example, applications related to multi-media signal processing used in video coding systems, including applications such as visual object classification, video summarization, image compression, acoustic scene classification, etc. Further, well trained NNs for different applications may be stored and/or transmitted (e.g., via wireless networks) to enable related various different commercial applications In the case of applications related to multi-media signal processing, there is an issue regarding efficient compression of the NN model. There has been discussion, and a call for proposals (CfP), regarding a NN compression standard, which may be referred to as compressed representation of a NN and/or neural network representation (NNR). For such NNR standard, the Motion Picture Experts Group (MPEG) aims to define an efficiently coded, interpretable and interoperable representation for trained NNs.

EXAMPLE NETWORKS FOR IMPLEMENTATION OF THE EMBODIMENTS

Figure 1A:
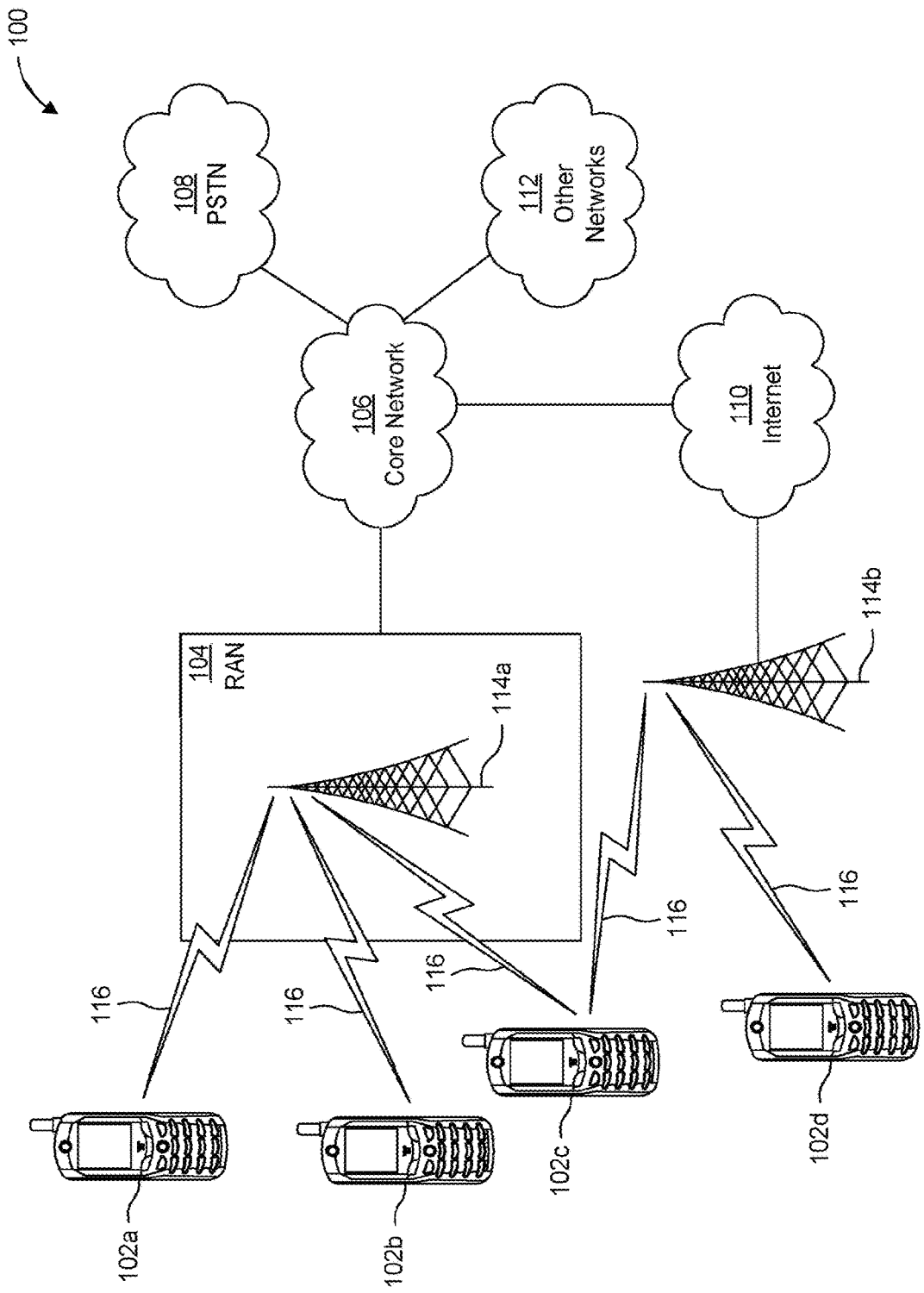
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
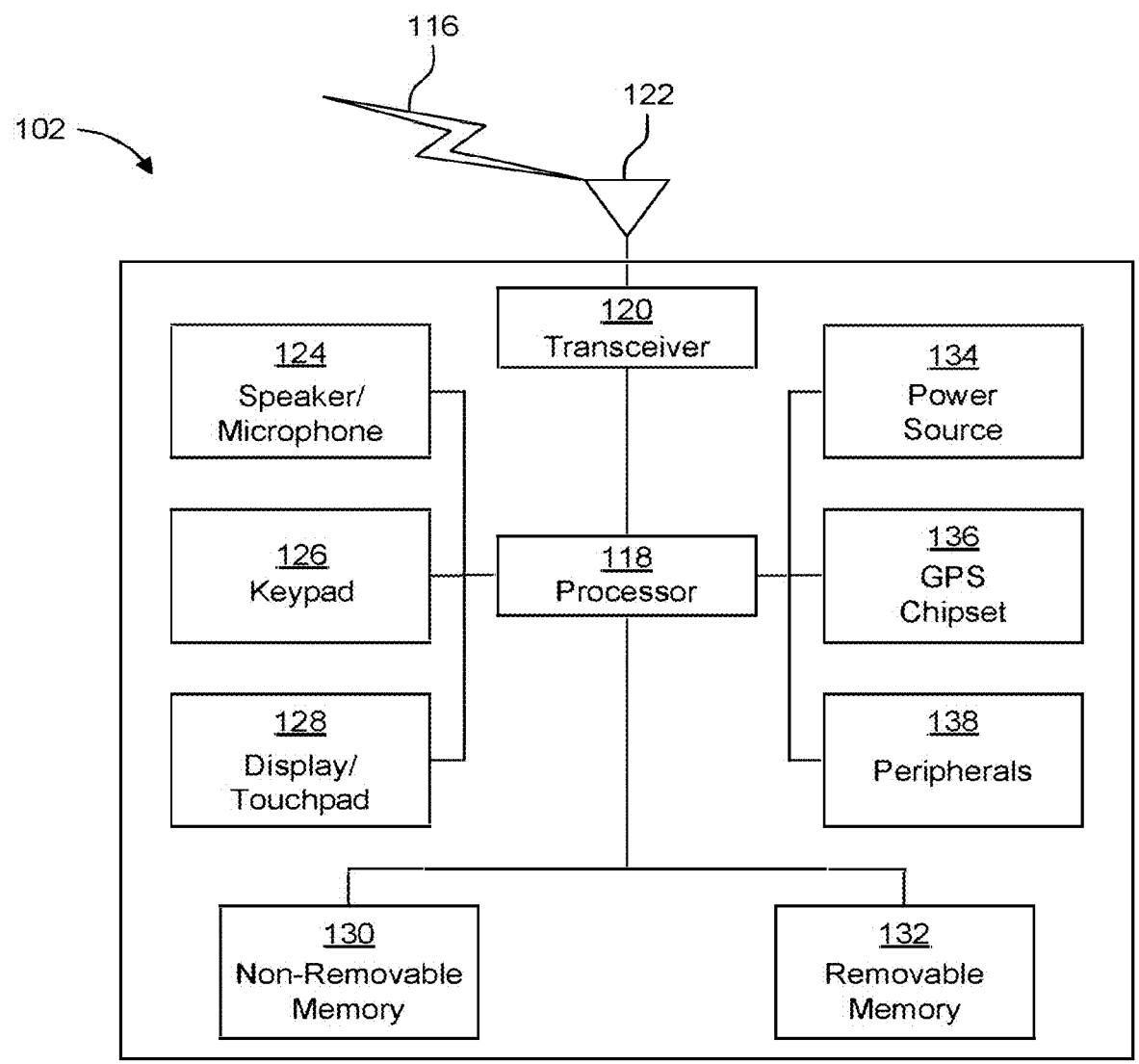
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
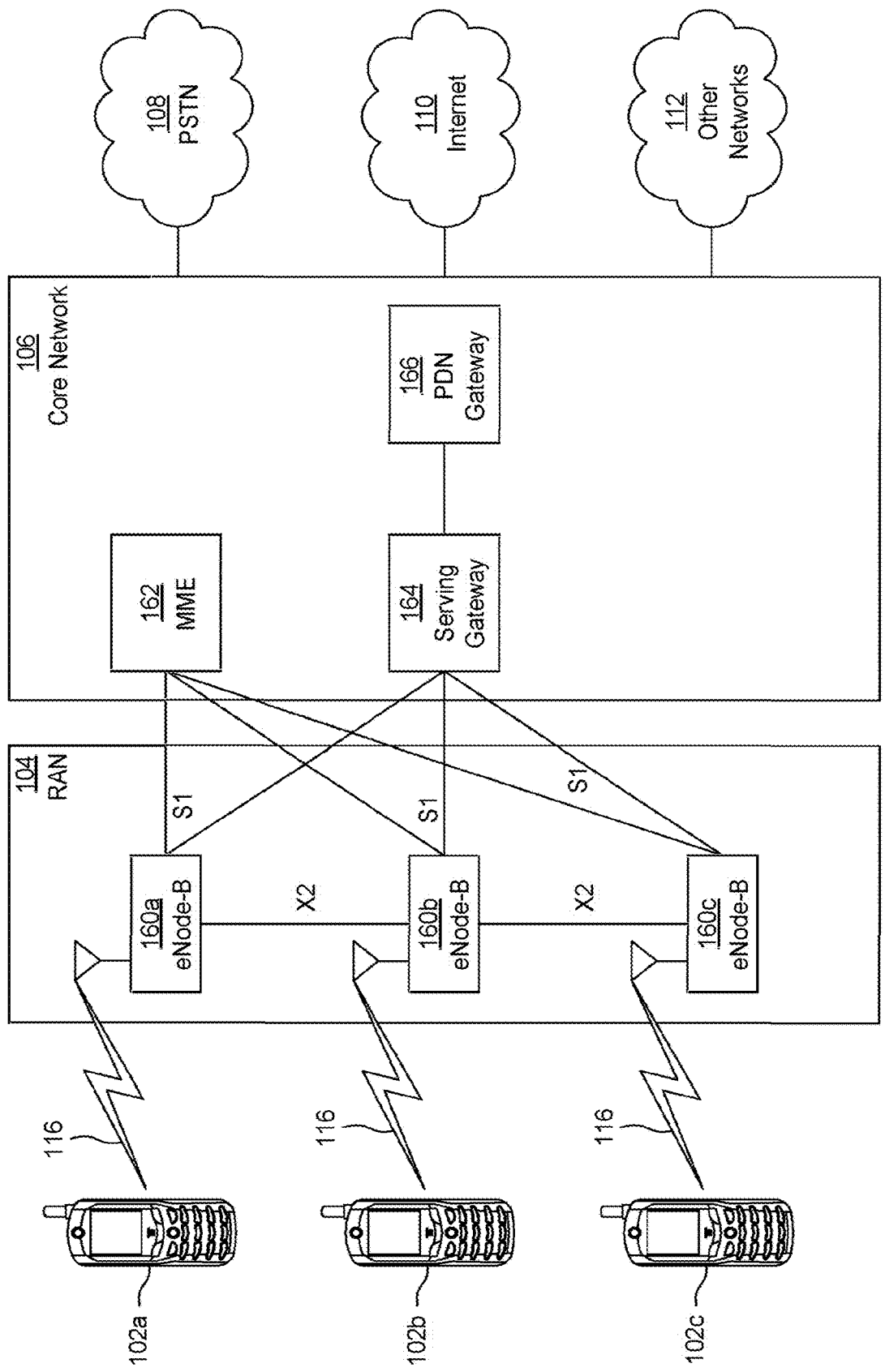
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
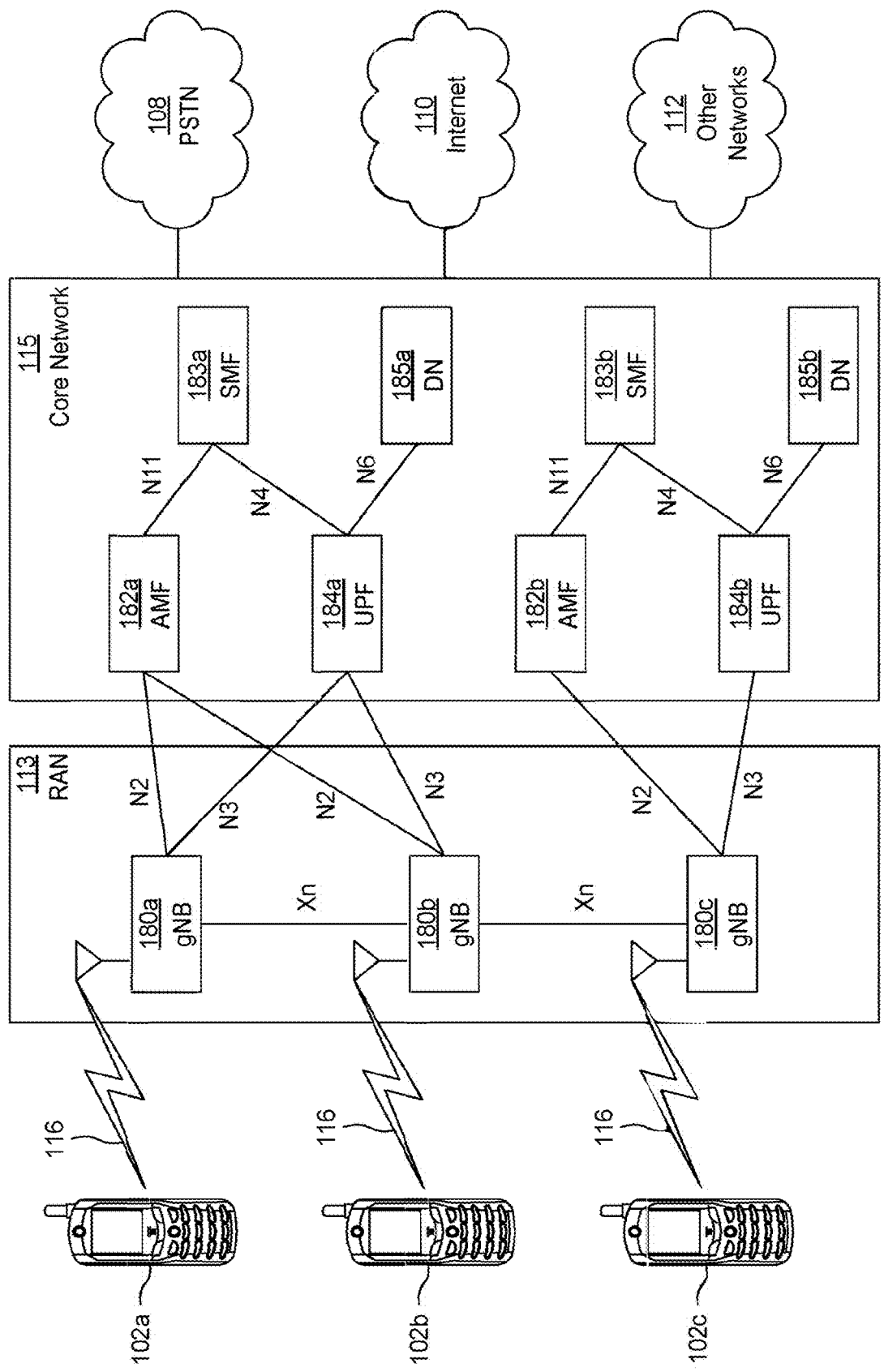
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a,184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185$b_1$.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

DETAILED DESCRIPTION

Compressed Representation of Neural Networks; Neural Network Representation (NNR)

Figure 2:
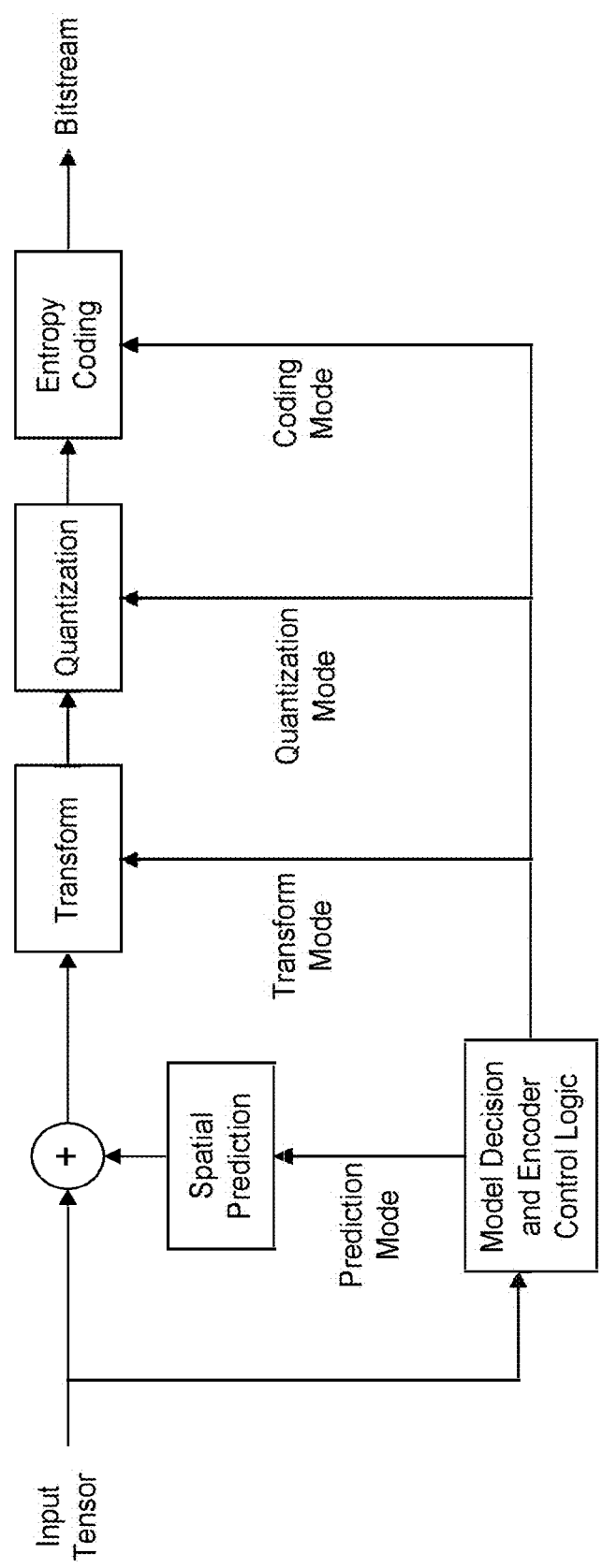
FIG. 2 is a diagram illustrating an encoder according to embodiments.

Both the HEVC Test Model (HM) and the Joint Exploration Model (JEM) software are built upon the block-based hybrid video coding framework (100). FIG. 2 illustrates a block diagram of a block-based hybrid video encoding system. Note that in the present application, the terms "reconstructed" and "decoded" may be used interchangeably. Usually, but not necessarily, the term "reconstructed" is used at the encoder side while "decoded" is used at the decoder side.

A model for a neural network (NN), which may be interchangeably referred to as a deep NN (DNN), may include any number of layers, including different types of layers. A layer may refer to any of a collection of (e.g., NN) nodes (e.g., of a NN, for example, that have a same and/or similar (e.g., NN) depth), a block (e.g., of NN nodes), a container (e.g., of data, for example, associated with certain nodes), etc. A layer may input, output, receive, transmit, store, etc., any of data, information, values, etc. For the (e.g., standard, typical, etc.) applications related to multi-media signal processing, there may different (e.g., any number of) types of NN layers, including any of a convolutional NN (CNN) layer, a fully connected (FC) layer, and a bias layer. A trained NN model may be (e.g., essentially) represented via a weight tensor (e.g., a multi-dimensional matrix) for each and/or any of its CNN, FC or bias layers and/or other layer types.

In an NN formulation (e.g., in a trained NN model), L may denote a number of layers, $\{W_1, W_L\}$ may denote weight matrices, $\{b_1, b_L\}$ may denote biases, and $g_k j$ may denote non-linearities; and with these weights, biases, and non-linearities, an output of $k^{th}$ layer $y^{k+1}$ may be as shown in Equation 1:

$$y^{k+1} = g_k(W_k y^k b_k) \quad [\text{Equation 1}],$$

where $y^1 = x$ may be an input to a DNN. Herein, for example as used with respect to a DNN, "deep" may mean, imply, indicate, and/or reference that a dimensionality (e.g. the number of columns and/or rows) of weight matrices from different layers may be very large, e.g. several hundred, for example, as may be the case in NNR testing scenarios, thousands, or may be any suitable number for dimensionality of weight matrices.

Each layer may be seen as (e.g., referred to as, considered to be, etc., essentially) a weight tensor (e.g. a multi-dimensional matrix), which is parameterized with a kernel matrix/tensor (as referred to herein, a matrix may be interchangeably referred to as a tensor), and a number of (and/or a number associated with) any of input and output features (a.k.a. channels).

A kernel may be a weight matrix/tensor, for example, of a certain (e.g., limited, configured, determined, etc.) size (e.g. 3×3, 5×5, or 3×3×3, etc.) that covers a certain local neighborhood of limited size when conducting convolution (and/or, e.g., equivalently, a certain kind of filtering) on high dimensional output data (e.g., signals, transmissions, outputs, etc.) from the previous NN layer (or the original input signal). Different kinds of weight matrices/tensors (e.g., having different dimensions) from different types of NN layers may be categorized as shown in Table 1.

TABLE 1

Weight tensor dimensions for different types of NN layers.

| Input signal type | Layer type | Weight tensor dimension |
|---|---|---|
| 3D signal: video/point cloud | Convolutional | $K_1 \times K_2 \times K_3 \times C_{in} \times C_{out}$ |
| 2D signal: image | Convolutional | $K_1 \times K_2 \times C_{in} \times C_{out}$ |
| 1D signal: audio | Convolutional | $K_1 \times C_{in} \times C_{out}$ |
|  | Fully connected | $C_{in} \times C_{out}$ |
|  | Bias | $C_{out}$ |

In Table 1, $K_1, K_2, K_3$ may represent the dimensions of the convolutional kernel, and $C_{in}$ and $C_{out}$ may denote the number of input and output features and/or channels, respectively. In certain use cases of NNR (e.g., of an NNR standard), a weight coefficient may be (e.g., is usually) stored as a 32 bits floating point number, whose value may be (e.g., often) observed to be between (e.g., in a range of) −1 and +1, but also may (e.g., is definitely allowed to) go beyond such range. A weight tensor may be any of a data object and/or the original signal to be compressed in the concerned NNR problem.

Existing NNR Technologies

NNR technologies may be composed of (e.g., may execute, perform, instantiate, etc.) any of the following modules: network pruning, sparsity regularization, weight tensor compression, and entropy coding. A network pruning module may transfer an original network to a smaller NN architecture, for example, an architecture of equivalent or similar classification capability and performance, using any of distillation or weight pruning. In the case of a network pruning module, retraining may be needed (e.g., usually required) in these technologies (e.g., network pruning modules), for example, to ensure the performance. A sparsity regularization module may (e.g., try to) increase a sparsity of weight sensors during a training process, for example, by introducing an additional sparsity regularization term on the training loss.

A weight tensor compression module may include any of the following: (1) a matrix factorization module for arranging the original weight tensor as a matrix and convert the original big matrix into smaller matrices using matrix factorization techniques, such as singular value decomposition; (2) a transform coding module for transforming the original weights to the frequency domain before quantization; (3) a scalar quantization module for treating the weight tensor as a list of real values (e.g., scalar points) and generating a code book by clustering the scalar points into several clusters, and the weights may be quantized to the closest cluster center; and (4) a vector quantization module for arranging the original weight matrix as a list of vectors (e.g., multi-dimensional points) and generating a code book by clustering these multi-dimensional points into several clusters, and scalar quantization may be treated as special case of vector quantization wherein a dimension degenerates to (e.g. a value of) one. An entropy coding module may perform further compression, for example, as a final step.

A comprehensive NNR framework with a (e.g., more complete) set of coding tools (e.g., technologies) modified from the HEVC video coding standard has been introduced. In such comprehensive NNR framework, all weight coefficients at the same position in the kernel tensors of a layer are separated out, which may form (e.g., be used as, be referred to as, etc.) a weight matrix, for example, for a (e.g., each, any, particular) kernel tensor position. The weight matrix of each kernel tensor position may then be considered as a 2D image (for example, with $C_{in}$ being the width of the image and $C_{out}$ being the height as shown in Table 1) of a (e.g., certain, specific, etc.) component channel (e.g., like a component channel of any of RGB or YUV in the case of image or video coding). Further, a latest (e.g., most current) HEVC based video coding paradigm may be used to compress a NN layer images of weight coefficients. Additionally, the comprehensive NNR framework may apply coding tree unit (CTU) and coding unit (CU) based tree partitions, for example, similar to those of HEVC, and the major coding method used is based on HEVC palette coding mode, which is an important/efficient coding tool for screen content coding. The achieved compression ratio is around 5 to 1 (e.g., 5×, for the MobileNet test case) and 20 to 1 (e.g., for the VGG16 test case) with minor NN classification performance losses.

Overall NNR Coding Paradigm/Framework

In addition to exploring new NNR specific coding method/technologies, at this early stage of NNR technology and developing a (e.g., first) NNR standard, there is a need for a commonly recognized high-level overall NNR coding paradigm and/or framework. For this new overall NNR coding paradigm and/or framework, most (e.g., if not all)

currently ongoing and/or future NNR standard development efforts may be (e.g., should, will be, etc.) well accommodated and/or integrated together to deliver superior coding performance as a complete NNR standard. Further, a comprehensive, flexible and efficient NNR coding framework is an important and valuable NNR technology, for example, even by itself.

A conventional and/or existing NNR framework may break a kernel tensor into separate channels for each of the tensor entry positions, and such breaking of the kernel tensor into separate channels may be a limitation on conventional and/or existing NNR frameworks. Further, in a case where a kernel tensor is broken into small (e.g., the smallest) pieces/units (e.g., with one single weight coefficient in each unit) in a (e.g., the very) beginning of and throughout a (e.g., the entire) compressing process, an (e.g., the best) achievable overall compression performance of a system may be limited. Additionally, conventional and/or existing NNR frameworks may only include capabilities for CTUs and CUs, but not for a prediction unit (PU) and/or a transform unit (TU). This is mainly due to the fact that such frameworks use palette coding as the only one coding mode at the moment, which may limit the framework's capability to accommodate other NNR methods into the framework.

A kernel tensor of trained NN weighting coefficients may be (e.g., viewed as, considered to be, etc., essentially) a filter, and the convolution calculation based on a kernel may be filtering process. According to embodiments, for example, for a new overall NNR coding paradigm and/or framework, which may be referred to herein as the new NNR framework, a (e.g., each, any, a set, all, etc.) kernel tensor, for example, formed and/or learned from training, may (e.g., should, may be considered to) reflect, represent, indicate, inform of, and/or capture, a feature of any of data, input data, output data, a signal, a transmission, etc.

According to embodiments, a kernel tensor formed via training may indicate a certain kind of meaningful and/or useful feature of the input data/signal, features such as, for example, any of edges, shapes, surfaces, or composite structures from them, etc. According to embodiments, a kernel tensor, as a meaningful unit of its entirety (e.g., as a singular entity/unit), may be a redundancy, and/or may be of a certain degree of redundancy, where the involved weight coefficients are (e.g., more or less) correlated to each other. According to embodiments, for a new overall NNR coding paradigm and/or framework, as other and/or new NNR methods may be represented and/or defined as other coding modes, for such NNR methods, prediction, transform, and/or other forms of processing may be conducted (e.g., according) to any of a (e.g., certain) PU or TU.

Figure 3:
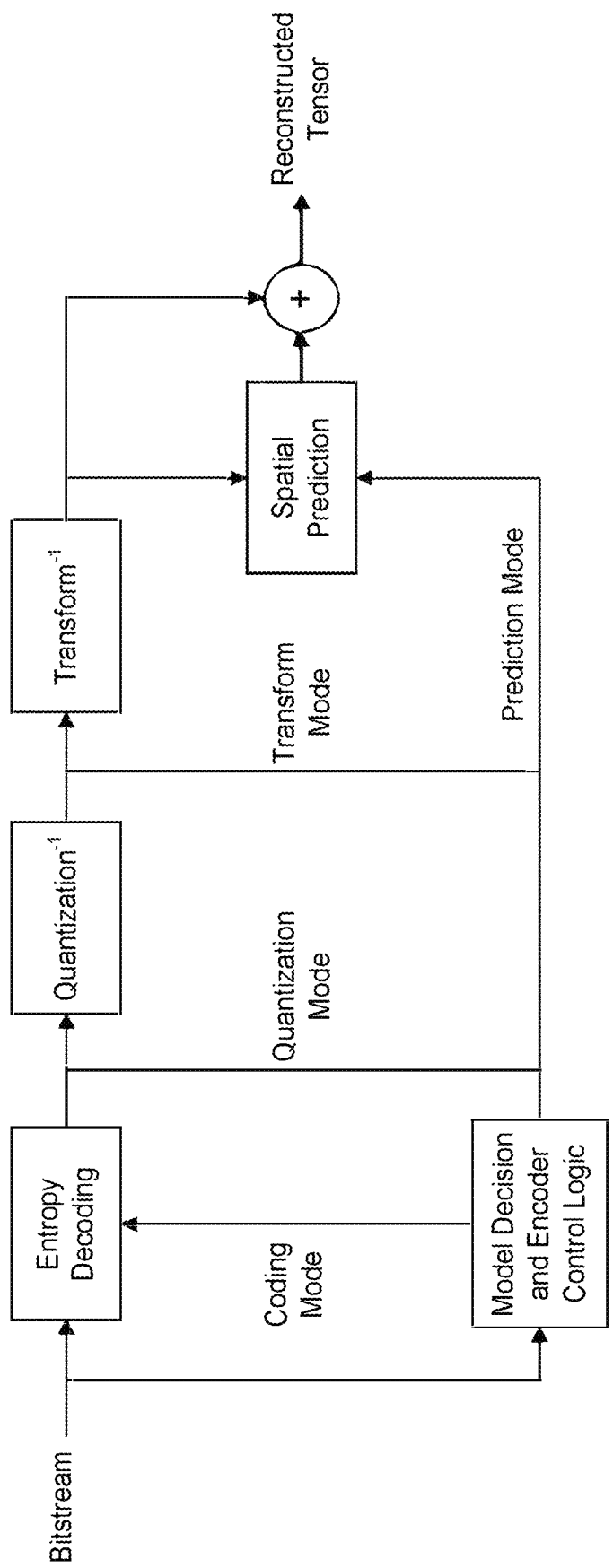
FIG. 3 is a diagram illustrating a decoder according to embodiments.

FIG. 2 is a diagram illustrating an encoder according to embodiments. FIG. 3 is a diagram illustrating a decoder according to embodiments.

According to embodiments, a (e.g., the above mentioned) new overall NNR coding paradigm and/or framework, may be a kernel tensor based NN compression framework. FIGS. 2 and 3 are general diagrams respectively illustrating the encoder and decoder of the new NNR framework. According to embodiments, the new NNR framework may be based on a tree partition based coding paradigm from any of existing and/or latest video coding standards of any of HEVC or VVC. According to embodiments, the new NNR framework may include any of the following features: (i) a (e.g., each) kernel tensor may be treated (e.g., used, considered, etc.) as a (e.g., most) basic coding unit; (2) use and/or inclusion of any of a PU or a TU, and/or information, modules, features, and/or operations associated with any of a PU or a TU; and (3) a (e.g., new) three-dimensional (3D) space tree partition and quantization unit (QU) based compression paradigm. The new NNR framework may be different than existing NNR frameworks because of at least the above noted features of the new NNR framework.

As noted above, existing NNR frameworks split a kernel (e.g., kernel tensor). According to embodiments, the new NNR framework may (e.g., always) look at and treat (e.g., consider) a (e.g., each) kernel tensor as a (e.g., most) basic coding unit and/or element (e.g., in the first place, from the outset, at a most basic level, etc.). According to embodiments, the new NNR framework may break a kernel tensor (e.g., only) at a time and in a manner (e.g., in a way) such that a result (e.g., of and/or associated with breaking of the kernel tensor) may be checked (e.g., verified, validated, etc.) and/or ensured, for example to achieve better coding efficiency. According to embodiments, absent the case where the kernel tensor is broken, the entirety of the kernel tensor may be preserved and compression may be performed on the kernel tensor, for example, at the end of a (e.g., entire) coding process.

According to embodiments, the new NNR framework may include any of a PU or a TU, for example, as included and/or used in any of a HEVC or VVC standard, and for example, in addition to any of a CTU or a CU. According to embodiments, including any of a PU or a TU in the new NNR framework may, for example, accommodate and/or integrate many other existing and/or future NNR methods and/or technologies into the new NNR frame work (e.g., into one same framework), for example, to deliver better overall compression performance.

According to embodiments, in the new NNR framework, for example, in and/or at the end of the new NNR framework pipeline, a (e.g., each particular) kernel tensor, and/or its sub-sets due to tree partitions, may (e.g., should, needs to, must, etc.) be compressed and coded. According to embodiments, for example, for application at the end of the new NNR framework pipeline, a (e.g., new) tree partition on the kernel tensor or sub-tensor (e.g. a 3D space or lower dimension space, for example, depending on the dimension of any of the kernel tensor or sub-tensor, etc.) and QU based compression paradigm may be used, for example, to efficiently code a kernel tensor, and, for example, to flexibly accommodate existing and/or future (e.g., effective) NNR methods with respect to compression and coding of the kernel tensor. According to embodiments, different kernel compression methods may be selected and/or used for kernel tensors of different dimensions and/or sizes.

Kernel Tensor as a Pixel

Figure 4:
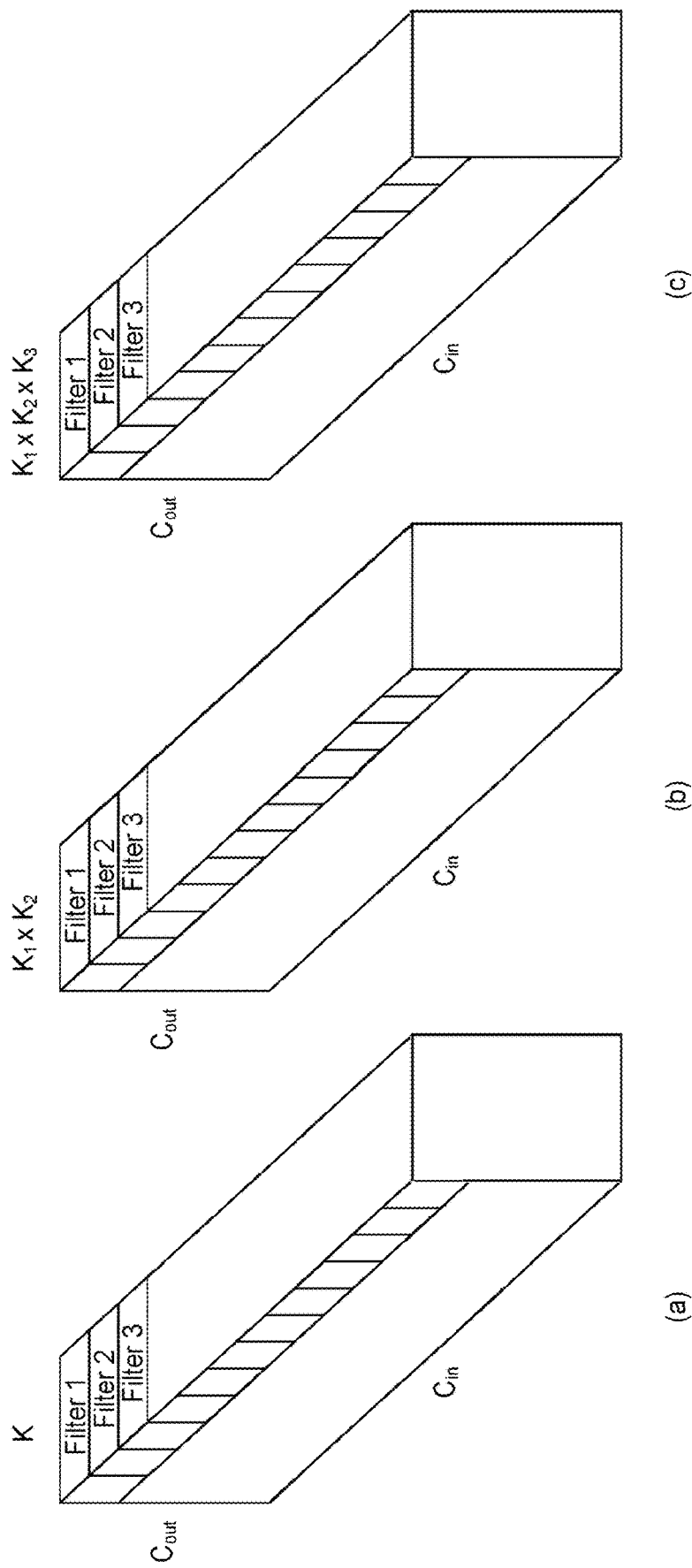
FIG. 4 is a diagram illustrating a kernel tensor as a pixel according to embodiments.

FIG. 4 is a diagram illustrating a kernel tensor as a pixel according to embodiments.

According to embodiments, the new NNR framework may, for example, as a core idea, consider and/or treat a kernel tensor as a non-separable coding unit, for example, that may be kept, stored, processed, used, etc., in its entirety, for example, in the very beginning, or in other words, from the outset or beginning of processing a kernel tensor. In contrast, as noted above, in existing NNR frameworks, a kernel tensor is broken into single weight coefficients at each tensor position in the very beginning and at all times of the entire compression process. Further, in such existing NNR frameworks, a kernel tensor may be a plurality of single weight coefficients (e.g., "pixels"). On the other hand, according to embodiments, the entirety of the weight tensors of a certain NN layer to be compressed may be viewed as a 2D image with each kernel tensor as a "pixel".

According to embodiments, a kernel tensor may be kept as an (e.g., in its) entirety throughout the tree partitioning process of any of a CTU and a CU. According to embodiments, a kernel tensor may be kept as an (e.g., in its) entirety throughout a (e.g., possibly different that any of the CTU and CU) partitioning of any of PU and a TU. According to embodiments, when conducting a (e.g., certain kind of) prediction between the original kernel tensor and the referenced kernel tensor, each entry and/or component of the (e.g., resulting, predicted, etc.) tensor may be predicted separately and/or individually.

According to embodiments, the new NNR framework may be for any (e.g., all possible) kernel dimensions and sizes, and may be, for example of and/or for a large variety and wide range of dimensions and sizes (e.g. from 1×1 to 3×1, 3×3, 5×5, 5×5×5, etc., in dimensionality, and/or with sizes such as 7 or larger). According to embodiments, the new NNR framework may accommodate any (e.g., all the) possible cases for any of kernel dimensions and/or sizes by having coding syntax and/or coding modes (and/or methods) not be the same (e.g., be quite different) for different kernel tensor sizes and/or dimensions. According to embodiments, (e.g., all) kernel tensors in a PU may be predicted from corresponding kernel tensors in a reference PU, for example, in a case where the tensor dimension is small (e.g. $K_1 \times K_2 \times K_3$ is less than a certain threshold).

According to embodiments, for example in a case where the tensor dimension is large (e.g., larger than a threshold), a flag may be signaled to indicate whether a prediction will be performed for a (e.g., the particular) kernel tensor or not. For example, a flag may be signaled because (e.g., it is highly likely that) the prediction mode may be efficient for most, but not all, of the tensors in a PU. According to embodiments, in a case where a kernel tensor dimension is high, even though signaling such a flag may costs more coding overhead, signaling of the flag may provide (e.g., may be a better trade-off on the) overall coding efficiency. According to embodiments, at an encoder side, tensor prediction decisions may be (e.g., similarly) rate-distortion optimized (RDO), for example, as in the case of video coding, for example, such that the involved distortion (e.g., herein) is accounting for the total distortion over all the tensor entries.

According to embodiments, the whole weight tensor of a certain NN layer to be compressed can be viewed as a 2D image with each kernel tensor as a pixel, for example, by not (e.g., without) breaking the kernel tensor into different individual channels in the very beginning. According to embodiments, for a kernel tensor that is a pixel, $C_{in}$ may be the width (e.g., of the kernel tensor that is the pixel) and $C_{out}$ may being the height (e.g., of the kernel tensor that is the pixel), for example, as shown in Table 1. According to embodiments, in a case of a kernel tensor being a pixel, existing video and/or image coding methods may be applied. According to embodiments, in a case of a kernel tensor being a pixel, an arrangement of a Cin*Cout image of 1D convolutional layer, 2D convolutional layer and 3D convolutional layer tensors is shown in FIG. 4.

Tree Partitions

In the case of video coding standards for any of HEVC and VVC, a picture is first divided into CTUs, and each CTU can be partitioned in a tree structure into CUs. According to embodiments, tree partitions may be tested and used in the new NNR framework, for example, tree partitions similar to those of any of HEV and VCC. According to embodiments, for such tree partitions to be tested and used, some (e.g., necessary) modifications may be used (e.g., needed) based on the actual testing and tuning result in practice. For example, according to embodiments, the maximally allowed CTU size may be changed from 128×128, as in VVC, to 64×64 in NNR. According to embodiments, some tree partition shapes and/or patterns of VVC may not be efficient for NNR, while some other (e.g., new) partition shapes and/or patterns may be found useful In the case of NNR a 2D kernel tensor image representing each NN layer should be (e.g., needs to be) compressed. According to embodiments, for a video coding paradigm, (e.g., only) the useful portion of spatial coding (e.g. tree partition, spatial prediction, etc.) is included in the new NNR framework. Further, any portion of temporal coding (e.g. motion compensation) may be excluded from the new NNR framework, because, for example, such portion may not be present in the concerned NNR problem.

Single-Tree, Multi-Tree, and Mixed-Tree at CU, PU, and TU Levels

Figure 5:
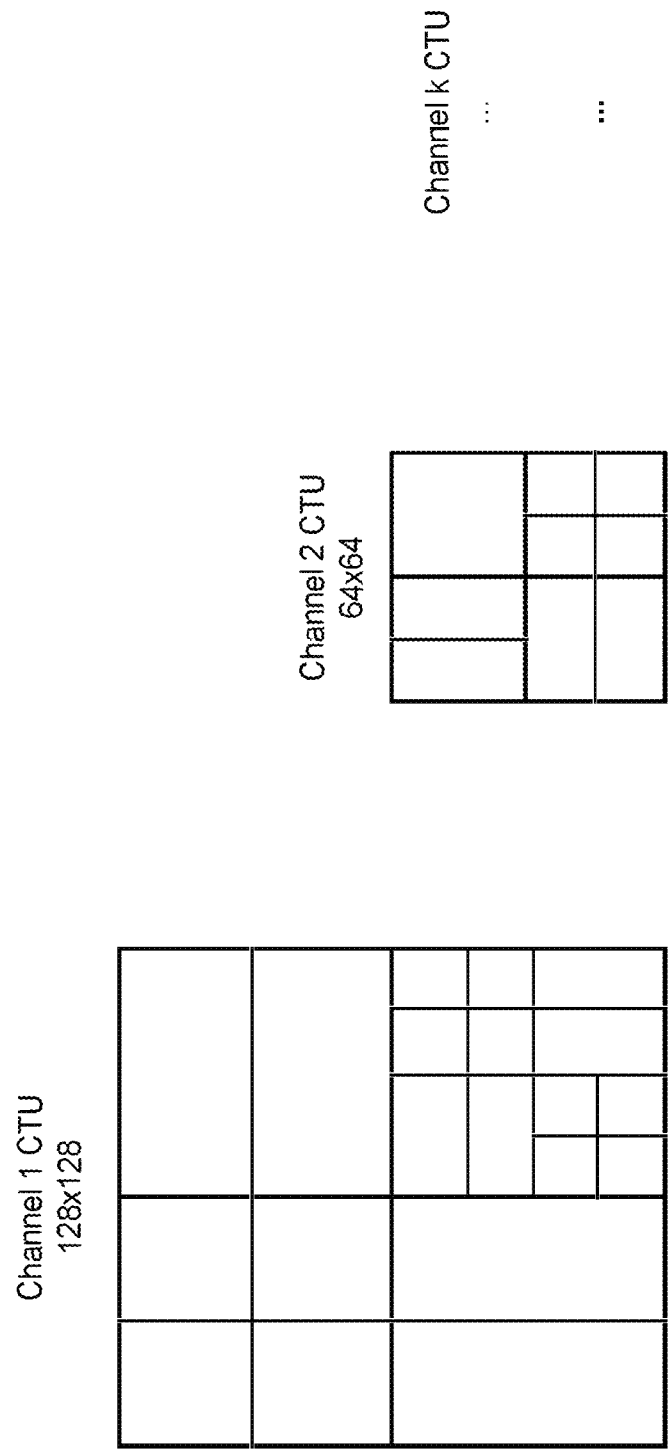
FIG. 5 is a diagram is a diagram illustrating multi-tree coding according to embodiments.

FIG. 5 is a diagram illustrating multi-tree coding according to embodiments. There may be a case of multi-tree coding, wherein each entry at a kernel tensor position may be considered as an individual component channel. In such a case of multi-tree, the existing NNR framework breaks the kernel tensor into each individual channel in the very beginning (e.g., of the framework process), and handles each channel 2D weight image via independent tree partitioning. Such existing NNR framework may be referred to as multi-tree coding, because each tensor channel is coded with different tree partitioning structures, and multiple trees are resulted.

According to embodiments (and, for example, in contrast to multi-tree coding wherein the kernel tensor is broken into individual channels), there may be a case of single-tree coding, wherein the kernel tensor may be kept in its entirety throughout the coding process and may be compressed at the very end of the new NNR framework. According to embodiments, in the case of single-tree coding, any of (e.g., all) the channels may bear the same tree partition structure, and the result may be a (e.g., only, one) single tree.

Figure 6:
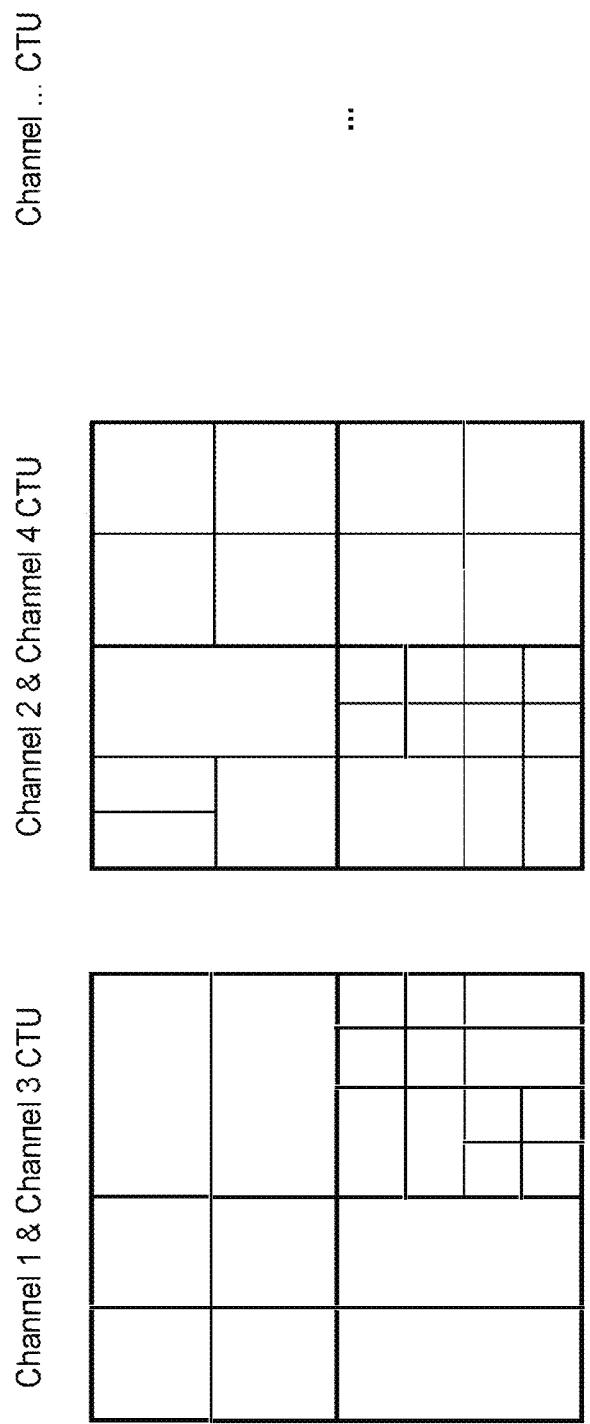
FIG. 6 is a diagram illustrating mixed-tree coding according to embodiments.

FIG. 6 is a diagram illustrating mixed-tree coding according to embodiments.

According to embodiments, there may be a case of mixed-tree coding, wherein some kernel tensor channels are well correlated and the remaining channels are not well correlated. According to embodiments, in the case of mixed-tree coding, kernel tensor channels that are well correlated may share the same tree partition, and the kernel tensor channels that are not well correlated may be coded with separate and/or independent tree partitions, which represents a mixed case of single-tree and multi-tree coding.

According to embodiments, the mixed-tree case may be considered as the (e.g., most) general form of kernel tensor-based coding trees, and both the single-tree coding and the multi-tree coding may be considered as two extreme cases of mixed-tree coding. According to embodiments, a mixed tree, in the most general form, may be considered as (e.g., is actually) a set and/or group of independently partitioned coding trees, wherein the pixel in each of the number of separate partition trees is (e.g., actually) a certain selected sub-set of tensor entries from the complete kernel tensor. In another words, a kernel tensor, according to embodiments, may be divided into a number of channels (and/or sub-sets of a kernel tensor, e.g., a "sub-tensor"), wherein each channel (and/or sub-tensor) includes (e.g., consists, is formed of) a certain number of kernel tensor entries at different positions in the kernel tensor. According to embodiments, the 2D image and/or picture of each channel (and/or sub-tensor) may be partitioned into different tree structures.

According to embodiments, for the new NNR framework, the more general relationship of the sizes of CU, PU and TU may be assumed to be the same and/or similar to that as in HEVC. That is, for the new NNR framework, any two from the three of CU, PU, and TU may not (e.g., necessarily) have the same unit size. For example, there may be a case where a PU size and a TU size are smaller than or equal to a CU size. According to embodiments, after CU-level tree partitioning, there may be (e.g., further) separate tree partitions for the following PUs and TUs. According to embodiments, in a case of separate tree partitions for the PUs and TUs, decisions on single-tree, multi-tree and mixed-tree selection may be made at any of (e.g., each, all, etc.) the different levels of CU, PU, and TU, respectively. According to embodiments, such decisions on single-tree, multi-tree and mixed-tree selection may be encoder-side decisions, and thus, can all be RD optimized to improve coding efficiency.

Coding Trees for Transformed Tensors TU Levels

According to embodiments, the above discussed coding trees are (e.g., all) in the original spatial domain of the kernel tensor (e.g. of dimension $K_1 \times K_2 \times K_3$). However, the present disclosure is not limited thereto. According to embodiments, an original kernel tensor may be: (1) transformed and (2) (e.g., then) partitioned into different coding trees. That is, according to embodiments, the original kernel tensor may be transformed by applying a 3D transform on the $K_1 \times K_2 \times K_3$ kernel tensor. Further, according to embodiments, the different sub-sets of frequency and/or transform-domain tensor entries and/or coefficients may be partitioned into different coding trees, as it is likely that the 2D image of a transform domain tensor channel is of more correlation among its sub-tensors and/or pixels.

Prediction Units

It is known that significant redundancy may exist between different feature channels and filter kernels; and it is observed that 2D images of the NN layer weight tensor data are more like computer generated noisy data, and thus, may be close to screen content rather than close to natural video content.

According to embodiments, in a case where NN layer weight tensor data are more like computer generated noisy data, screen content video coding methods may also be used for (e.g., useful in) the new NNR framework. According to embodiments, any of Intra-Block-Copy (IBC), palette (PLT) coding mode, Intra prediction (INTRA) mode and/or other prediction modes that are typically used in video coding (e.g. HEVC and VVC) may be adopted and/or modified for NNR coding, for example, in the new NNR framework.

For example, the vector quantization method widely used in neural network compression may be (e.g., very) similar to the PLT coding mode in video coding, as both methods maintain a codebook and a list of code index. According to embodiments, in a case where the neighbor CTUs share the same stochastic properties, IBC may be applied to share the codebook. Or, according to embodiments, the codebook of neighbor CTUs may be used to predict the codebook of the next CTU in the INTRA mode.

According to embodiments, in a case where PU-level partitioning chooses (e.g., is chosen from among) multi-tree coding or mixed-tree coding, different coding modes may be selected and/or used for different trees. According to embodiments, prediction of a current kernel tensor, and/or current kernel sub-tensor, from a prediction reference tensor, and/or prediction reference sub-tensor, may be conducted via performing prediction at each tensor, and/or sub-tensor, position.

Transform Units

According to embodiments, transform coding is conducted after prediction, for example, similar to as in a video coding pipeline. According to embodiments, the new NNR framework may include the concept of TU, for example, as used in HEVC. According to embodiments, (e.g., most generally) TU partition may be performed on/from a CU, but not (e.g., necessarily) on/from a PU, which may be of a smaller or equal size than that of a CU). According to embodiments, in the new NNR framework, a few different transform coding modes may be included, which may be similar as in VVC, such as, for example, coding modes of various different transforms and/or the transform skip mode.

According to embodiments, in the new NNR framework, existing and future NNR specific coding methods may (e.g., also) be accommodated as new transform modes. For example, the NNR specific coding methods included in the new NNR framework may be matrix factorization modes and/or methods that are particularly designed and developed for NNR. According to embodiments, in the new NNR framework, linear transforms (e.g. column and/or row swap transforms) which rearrange the matrix may also be applied to increase a spatial correlation, and, for example, increase a compression ratio. According to embodiments, in the new NNR framework, in a case where TU-level partitioning chooses any of multi-tree or mixed-tree, different transform coding modes may be selected and used for different trees.

According to embodiments, in the new NNR framework, the transform of a TU of kernel tensors, and/or sub-tensors, may be conducted by (e.g., first) dividing each tensor and/or sub-tensor into channels consisting of each individual tensor and/or sub-tensor entry, and (e.g., second) applying the same transform on each individual channel TU, and (e.g., third) dividing the transformed channel TU back into entries belonging to each tensor and/or sub-tensor. That is, according to embodiments, a TU of tensors, and/or sub-tensors, may be constructed such that each tensor, and/or sub-tensor, (e.g., now) contains all the transformed coefficients of a certain (e.g., same) frequency, and/or transform domain position index, from all the transformed channel TUs. That is, according to embodiments, tensors, and/or sub-tensors, located at a top-left portion of a transformed TU may consist of low frequency coefficients, while tensors, and/or sub-tensors, located at a bottom-right portion of the transformed TU may consist of high frequency coefficients.

Kernel Tensor and/or Sub-Tensor Compression

According to embodiments, in the new NNR framework, at the end of the (e.g., entire) NNR pipeline of the new NNR framework, for example, after (e.g., all the possible) tree partitions at CU-, PU-, and/or TU-levels are completed, there may be a (e.g., last) step (e.g., operation, process, etc.) to compress each resultant kernel tensor. For example, in a case where all the CU/PU/TU-level tree partitions are the single-tree (or mixed-tree), each resultant kernel tensor (and/or sub-tensor) may be compressed. That is, according to embodiments single-tree partition may preserve the full and/or complete kernel tensor without dividing it into subgroups (e.g., sub-tensors). In a case involving non-single-tree partition, then a kernel tensor may be (e.g., has been) divided into sub-groups (e.g., sub-tensors) in those non-single tree partitions before the end. In such a case, according to embodiments, a (e.g., next, last, etc.) step is to compress the sub-tensor, for example, but not the full and/or complete kernel tensor. According to embodiments, in the new NNR framework, for the (e.g., most general and challenging) case of $K_1 \times K_2 \times K_3$ kernel tensor compression in the new NNR framework, an efficient, flexible, and comprehensive coding paradigm may be used for such kernel tensor compression.

Three-Dimensional (3D) Space Tree Partition

According to embodiments, in the new NNR framework, tree partitioning may be conducted on a 3D space kernel tensor. That is, the use of tree partitioning may be extended from being conducted on two-dimensional (2D) space kernel tensor images to being conducted on a 3D space kernel tensor itself. According to embodiments, in the new NNR framework, in 3D space, tree partitioning may be conducted by recursively separating and/or partitioning a 3D tensor cube into multiple sub-tensor cubes, and/or "sub-cubes", for example, in order to form a resultant 3D space tensor partition tree. Such 3D space tree partitioning may be conducted in a manner similar as that of 2D space tree partitioning.

Quantization Units

According to embodiments, a (e.g., each) sub-tensor cube, or sub-cube (e.g., each leaf of a 3D tensor partition tree) may be referred to as a quantization unit (QU), for example, because quantization may be applied on such (e.g., very last) coding unit in the (e.g., entirety of the) NNR pipeline of the new NNR framework. According to embodiments, a QU may be a 3D cube. According to embodiments, transform coding with quantization (e.g. any of scalar quantization, dependent quantization as in VVC, etc.) may be applied to the QU. For example, in the new NNR framework, the transform may be any of 3D or 2D transforms, and the involved quantization may be any of scalar quantization (SQ), dependent quantization (DQ) as in VVC, or some other appropriate and/or applicable quantization approaches, such as, for example, lattice quantization (LQ), and vector quantization (VQ), etc. According to embodiments, various transform options may be coded as different transform modes, including transform skip mode, while the various quantization methods may be coded as different quantization modes. According to embodiments, in a case where a QU size (e.g., a total number of samples in the QU) is less than a (e.g., certain) limit, the transform may be skipped, and any of SQ, DQ, or VQ may be applied to the (e.g., small) QU, for example, directly.

Various methods and other aspects described in this application can be used to modify modules, for example, the inter prediction, and/or transform modules (162, 104, 112, 262, 212), of a video encoder 100 and decoder 200 as shown in FIG. 2 and FIG. 3. Moreover, the present aspects are not limited to VVC or HEVC, and can be applied, for example, to other standards and recommendations, and extensions of any such standards and recommendations.

Various numeric values are used in the present application, for example, the block size used to determine the template size The specific values are provided for example purposes and the aspects described are not limited to these specific values.

Various implementations involve decoding. "Decoding", as used in this application, can encompass all or part of the processes performed, for example, on a received encoded sequence in order to produce a final output suitable for display. In various embodiments, such processes include one or more of the processes typically performed by a decoder, for example, entropy decoding, inverse quantization, inverse transformation, and differential decoding. Whether the phrase "decoding" is intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application can encompass all or part of the processes performed, for example, on an input video sequence in order to produce an encoded bitstream. In various embodiments, such processes include one or more of the processes typically performed by an encoder, for example, partitioning, differential encoding, transformation, quantization, and entropy encoding.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a UE, WTRU, terminal, base station, RNC, or any host computer.

Moreover, in the embodiments described above, processing platforms, computing systems, controllers, and other devices including the constraint server and the rendezvous point/server containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed".

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the exemplary embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory ("RAM")) or non-volatile (e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (but not always, in that in certain contexts the choice between hardware and software may become significant) a design choice representing cost vs. efficiency tradeoffs. There may be various vehicles by which processes and/or systems and/or other technologies described herein may be effected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs), Field Programmable Gate Arrays (FPGAs) circuits, any other type of integrated circuit (IC), and/or a state machine.

Although features and elements are provided above in particular combinations, one of ordinary skill in the art will appreciate that each feature or element can be used alone or in any combination with the other features and elements. The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

It is also to be understood that the terminology used herein is for the purpose of describing particular embodiments only, and is not intended to be limiting. As used herein, when referred to herein, the terms "user equipment" and its abbreviation "UE" may mean (i) a wireless transmit and/or receive unit (WTRU), such as described infra; (ii) any of a number of embodiments of a WTRU, such as described infra; (iii) a wireless-capable and/or wired-capable (e.g., tetherable) device configured with, inter alia, some or all structures and functionality of a WTRU, such as described infra; (iii) a wireless-capable and/or wired-capable device configured with less than all structures and functionality of a WTRU, such as described infra; or (iv) the like. Details of an example WTRU, which may be representative of any WTRU recited herein.

In certain representative embodiments, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Moreover, as used herein, the term "set" or "group" is intended to include any number of items, including zero. Additionally, as used herein, the term "number" is intended to include any number, including zero.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claim is intended to invoke 35 U.S.C. § 112, ¶ 6 or means-plus-function claim format, and any claim without the terms "means for" is not so intended.

A processor in association with software may be used to implement a radio frequency transceiver for use in a wireless transmit receive unit (WTRU), user equipment (UE), terminal, base station, Mobility Management Entity (MME) or Evolved Packet Core (EPC), or any host computer. The WTRU may be used in conjunction with modules, implemented in hardware and/or software including a Software Defined Radio (SDR), and other components such as a camera, a video camera module, a videophone, a speakerphone, a vibration device, a speaker, a microphone, a television transceiver, a hands free headset, a keyboard, a Bluetooth® module, a frequency modulated (FM) radio unit, a Near Field Communication (NFC) Module, a liquid crystal display (LCD) display unit, an organic light-emitting diode (OLED) display unit, a digital music player, a media player, a video game player module, an Internet browser, and/or any Wireless Local Area Network (WLAN) or Ultra Wide Band (UWB) module.

Although the invention has been described in terms of communication systems, it is contemplated that the systems may be implemented in software on microprocessors/general purpose computers (not shown). In certain embodiments, one or more of the functions of the various components may be implemented in software that controls a general-purpose computer.

In addition, although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A method of decoding a trained neural network (NN) (TNN), the method comprising:
   determining a first weight tensor (WT) associated with the TNN and a second WT associated with the TNN;
   determining information associated with the TNN, wherein the information associated with the TNN indicates a layer type associated with a convolution NN (CNN);
   generating an image based at least on an arrangement of the first WT and the second WT of the TNN;
   generating a CNN layer based on the arrangement of the first WT and the second WT of the TNN, wherein the CNN layer includes a plurality of kernel tensors (KTs), wherein the plurality of the KTs includes a set of values of the first WT of the TNN and the second WT of the TNN, and wherein for each KT, an entirety of the each KT is used for generating tree partitions; and
   outputting an NN model, wherein the NN model includes at least the generated CNN layer.

2. The method of claim 1, wherein, for the each KT, the entirety of the each KT is used for generating tree partitions for any of a prediction unit (PU) or a transform unit (TU).

3. The method of claim 1, further comprising using or selecting any of a coding syntax, a coding mode, or a coding method according to any of a dimension of a KT from the plurality of KTs and a size of the KT from the plurality of KTs.

4. The method of claim 1, wherein the layer type is any of: a convolutional layer type, a fully connected layer type, and a bias layer type.

5. The method of claim 1, wherein the method further comprises:
   receiving a signal, wherein the signal is associated with one of a three-dimensional (3D) signal type associated with a video or a point cloud, a two-dimensional (2D) signal type associated with the image, or a one-dimensional (1D) signal type associated with audio, wherein the received signal is configured to be a picture and a number of reference pictures according to the arrangement of the received WTs of the TNN.

6. The method of claim 1, wherein the KTs are associated with a tree partition type (TPT), and wherein the TPT is one of a single tree type, a multi-tree type, or a mixed tree type.

7. The method of claim 1, wherein the plurality of KTs are divided into a plurality of sub-tenors, wherein each sub-tensor in the plurality of sub-tensors includes a respective number of weight coefficients.

8. The method of claim 7, further comprising compressing coding of the plurality of KTs by compressing and coding the plurality of sub-tensors associated with the KTs.

9. The method of claim 8, further comprising compressing and coding at least one of the KTs or sub-tensors by performing tree partitions on the at least one of the KTs or the sub-tensors and a quantization unit (QU).

10. The method of claim 1, wherein generating the CNN layer further comprises,
    determining, for the plurality of KTs, at least one of: an input signal type of the each KT in the plurality of KTs, or a plurality of tree partition types (TPTs) of the each KT; and
    decoding the plurality of KTs according to one of the input signal type of the each KT or the determined TPTs for each KT in the plurality of KTs, wherein the TPTs are one of a coding tree unit (CTU), a coding unit (CU), a prediction unit (PU), or a transform unit (TU).

11. A wireless transmit receive unit (WTRU) comprising circuitry including a transmitter, a receiver, a processor and memory, configured to:
    determining a first weight tensor (WT) associated with the TNN and a second WT associated with the TNN;
    determine information associated with the TNN, wherein the information associated with the TNN indicates a layer type associated with a convolution NN (CNN);
    generate an image based at least on an arrangement of the first WT and the second WT of the TNN;
    generate a CNN layer based on the arrangement of the first WT and the second WT of the TNN, wherein the CNN layer includes a plurality of kernel tensors (KTs), wherein the plurality of the KTs includes a set of values of the first WT of the TNN and the second WT of the TNN, and wherein for each KT, an entirety of the each KT is used for generating tree partitions; and
    output an NN model, wherein the NN model includes at least the generated CNN layer.

12. The WTRU of claim 11, wherein, for the each KT, the entirety of the each KT is used for generating tree partitions for any of a prediction unit (PU) or a transform unit (TU).

13. The WTRU of claim 11, configured to use or select any of a coding syntax, a coding mode, or a coding method according to any of a dimension of a KT from the plurality of KTs and a size of the KT from the plurality of KTs.

14. The WTRU of claim 11, wherein the layer type is any of: a convolutional layer type, a fully connected layer type, and a bias layer type.

15. The WTRU of claim 11, wherein the processor is further configured to:
    receive a signal, wherein the signal is associated with one of a three-dimensional (3D) signal type associated with a video or a point cloud, a two-dimensional (2D) signal type associated with the image, or a one-dimensional (1D) signal type associated with audio, wherein the received signal is configured to be a picture and a number of reference pictures according to the arrangement of the received WTs of the TNN.

16. The WTRU of claim 11, wherein the KTs are associated with a tree partition type (TPT), and wherein the TPT is one of a single tree type, a multi-tree type, or a mixed tree type.

17. The WTRU of claim 11, wherein the plurality of KTs are divided into a plurality of sub-tenors, wherein each sub-tensor in the plurality of sub-tensors includes a respective number of weight coefficients.

18. The WTRU of claim 17, wherein the processor is further configured to compress coding of the plurality of KTs by compressing and coding the plurality of sub-tensors associated with the KTs.

19. The WTRU of claim 18, wherein the processor is further configured to compress and code at least one of the KTs or sub-tensors by performing tree partitions on the at least one of the KTs or the sub-tensors and a quantization unit (QU).

20. The WTRU of claim 1, wherein for the generation of the CNN layer, the processor is further configured to:
    determine, for the plurality of KTs each KT, at least one of: an input signal type of the each KT in the plurality of KTs, or a plurality of tree partition types (TPTs) of the each KT; and
    decode the plurality of KTs according to one of the input signal type of the each KT or the determined TPTs for each KT in the plurality of KTs, wherein the TPTs are one of a coding tree unit (CTU), a coding unit (CU), a prediction unit (PU), or a transform unit (TU).

\* \* \* \* \*